United States Patent
Toda

(10) Patent No.: US 11,511,420 B2
(45) Date of Patent: Nov. 29, 2022

(54) MACHINE LEARNING DEVICE, ROBOT SYSTEM, AND MACHINE LEARNING METHOD FOR LEARNING OPERATION PROGRAM OF ROBOT

(71) Applicant: FANUC CORPORATION, Yamanashi (JP)

(72) Inventor: Syuntarou Toda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 452 days.

(21) Appl. No.: 15/702,495

(22) Filed: Sep. 12, 2017

(65) Prior Publication Data
US 2018/0079076 A1 Mar. 22, 2018

(30) Foreign Application Priority Data
Sep. 16, 2016 (JP) .............................. JP2016-182233

(51) Int. Cl.
*G06N 3/08* (2006.01)
*B25J 9/16* (2006.01)
(Continued)

(52) U.S. Cl.
CPC .............. *B25J 9/1664* (2013.01); *B25J 9/163* (2013.01); *B25J 19/023* (2013.01);
(Continued)

(58) Field of Classification Search
CPC .......... G06N 3/04; G06N 3/008; G06N 3/084; G06N 5/022; G06N 20/00; G06N 3/08;
(Continued)

(56) References Cited

U.S. PATENT DOCUMENTS 7,403,904 B2 * 7/2008 Abe .................. G06Q 10/06375
705/7.29
8,374,421 B1 * 2/2013 Hickman ............... B25J 9/1697
382/153
(Continued)

FOREIGN PATENT DOCUMENTS

DE 102013203381 A1 9/2013
JP 2003-94364 A 4/2003
(Continued)

OTHER PUBLICATIONS

Kartoun, Uri et al "Physical Modeling of a Bag Knot in a Robot Learning system" IEEE 2010 [Online] Downloaded Oct. 24, 2019 https://ieeexplore.ieee.org/stamp/stamp.jsp?tp=&arnumber=4912368&tag=1 (Year: 2010).*
(Continued)

*Primary Examiner* — Ben M Rifkin
(74) *Attorney, Agent, or Firm* — Hauptman Ham, LLP

(57) ABSTRACT

A machine learning device, which learns an operation program of a robot, includes a state observation unit which observes as a state variable at least one of a shaking of an arm of the robot and a length of an operation trajectory of the arm of the robot; a determination data obtaining unit which obtains as determination data a cycle time in which the robot performs processing; and a learning unit which learns the operation program of the robot based on an output of the state observation unit and an output of the determination data obtaining unit.

8 Claims, 7 Drawing Sheets

(51) Int. Cl.
*G06N 20/00* (2019.01)
*G05B 13/02* (2006.01)
*G06N 3/00* (2006.01)
*B25J 19/02* (2006.01)
*G06N 5/02* (2006.01)

(52) U.S. Cl.
CPC ....... *G05B 13/029* (2013.01); *G05B 13/0265* (2013.01); *G06N 3/008* (2013.01); *G06N 3/08* (2013.01); *G06N 3/084* (2013.01); *G06N 5/022* (2013.01); *G06N 20/00* (2019.01); *G05B 2219/32334* (2013.01); *G05B 2219/33321* (2013.01); *G05B 2219/45104* (2013.01); *G05B 2219/45135* (2013.01)

(58) Field of Classification Search
CPC ........ B25J 9/1664; B25J 9/163; B25J 19/023; G05B 13/0265; G05B 13/029
See application file for complete search history.

(56) References Cited

U.S. PATENT DOCUMENTS

| | | | |
|---|---|---|---|
| 2005/0080513 A1* | 4/2005 | Ito | G06N 3/08 700/245 |
| 2013/0178952 A1* | 7/2013 | Wersborg | G06V 10/7715 700/47 |
| 2013/0345870 A1 | 12/2013 | Buehler et al. | |
| 2014/0081895 A1* | 3/2014 | Coenen | G05B 13/027 706/25 |
| 2014/0277744 A1 | 9/2014 | Coenen | |

FOREIGN PATENT DOCUMENTS

| | | |
|---|---|---|
| JP | 4087841 B2 | 5/2008 |
| JP | 2012-240142 A | 12/2012 |
| JP | 2013-106202 A | 5/2013 |
| JP | 2014-228972 A | 12/2014 |
| JP | 5969676 B1 | 8/2016 |

OTHER PUBLICATIONS

Kumra, Sulabh and Ferat Sahin. "Dual Flexible 7 DoF Arm Robot Learns like a CHild to Dance using Q-Learning" 2015 [Online] downloaded Oct. 24, 2019 https://ieeexplore.ieee.org/stamp/stamp.jsp?tp=&arnumber=7151920 (Year: 2015).*

Harada, Tomoki et al. "Vibration Suppression Control Using a Pattern Generator for a Robot Driven by Air Actuators" 2009 [Online] Downloaded Jul. 28, 2021 https://ieeexplore.ieee.org/stamp/stamp.jsp?tp=&arnumber=4913095&tag=1 (Year: 2009).*

Kumra, Sluabh and Ferat Sahin. "Dual Flexible 7 DoF Arm Robot Learns like a Child to Dance using Q-Learning" 2015 https://ieeexplore.ieee.org/stamp/stamp.jsp?tp=&arnumber=7151920&tag=1 (Year: 2015).*

Boedecker, Joschka et al. "Approximate Real-Time Optimal Control Based on Sparse Gaussian Process Models" 2014 [Online] Downloaded Jul. 28, 2021 https://ieeexplore.ieee.org/stamp/stamp.jsp?tp=&arnumber=7010608 (Year: 2014).*

Tadepalli, Prasad, DoKyeong Ok. "MOdel-based average reward reinforcement learning" 1998. [Online] Downloaded Jul. 28, 2022 https://www.sciencedirect.com/science/article/pii/S0004370298000022 (Year: 1998).*

* cited by examiner

MACHINE LEARNING DEVICE, ROBOT SYSTEM, AND MACHINE LEARNING METHOD FOR LEARNING OPERATION PROGRAM OF ROBOT

RELATED APPLICATIONS

The present application claims priority of Japanese Application Number 2016-182233 filed Sep. 16, 2016, the disclosure of which is hereby incorporated by reference herein in its entirety.

BACKGROUND OF THE INVENTION

1. Field of the Invention

The present invention relates to a machine learning device, a robot system, and a machine learning method for learning an operation program of a robot.

2. Description of the Related Art

Conventionally, in a spot welding robot which performs spot welding of a vehicle body of a car, and the like, a teaching program which causes the spot welding robot to pass a plurality of spot welding points in order is created by a teacher (person). In other words, the teacher teaches the spot welding robot the plurality of spot welding points in consideration of an order in which welding is efficiently performed for the plurality of welding points.

For example, the teacher sets, between a welding point and the subsequent welding point, several teaching points which a robot arm passes, and also sets a speed and an acceleration with respect to an operation therebetween. In other words, to shorten a processing time (cycle time) by the spot welding robot, the teacher, for example, sets the teaching points such that a trajectory of the robot arm is the shortest, and further, changes settings of the acceleration and deceleration and the speed between respective teaching points.

Incidentally, hitherto, for example, Japanese Patent No. 4087841 discloses a robot controller which moves a robot hand along a path adapted to an actual position at which a workpiece is arranged, selects a specific target position in order to reduce a cycle time of an operation of the robot hand, and stores a plurality of different path patterns as approaching and leaving paths of the robot hand with respect to the selected specific target position. The robot controller is configured to select one path pattern from the plurality of path patterns as stored on the basis of a position of the workpiece detected by a visual sensor, modify the selected path pattern such that the target position toward which the robot hand heads and the actual position of the workpiece are coincident with each other to move the robot hand.

As described above, hitherto, there has been proposed the robot controller which selects one path pattern from the plurality of path patterns on the basis of a position of the workpiece detected by the visual sensor, and further, modifies the selected path pattern such that the target position of the robot hand (robot arm) and the actual position of the workpiece are coincident with each other, thereby controlling movement of the robot arm.

However, for example, in the spot welding robot which performs spot welding at a multitude of welding points on a vehicle body of a car, it is difficult for a teacher (person) to perform settings (teachings) such that a trajectory in which the robot arm passes such a multitude of welding points is the shortest. In addition, in view of settings of the acceleration and deceleration and the speed between respective teaching points, and considering that welding is to be performed after variation of spot welding accuracy due to the shaking of the robot arm reduces and the shaking of the robot arm stops, and the like, it is difficult for the teacher to teach an optimal trajectory, speed, and acceleration of the robot arm which achieve a short cycle time.

In the present description, as an example of a robot to which the present invention is applied, a spot welding robot will be described, but application of the present invention is not limited to the spot welding robot, and application can be widely made to various industrial robots and service robots.

In view of the problem of the prior art as described above, an object of the present invention is to provide a machine learning device, a robot system, and a machine learning method which can acquire an operation program of a robot as modified.

SUMMARY OF INVENTION

According to a first aspect of the present invention, there is provided a machine learning device which learns an operation program of a robot, including: a state observation unit which observes as a state variable at least one of a shaking of an arm of the robot and a length of an operation trajectory of the arm of the robot; a determination data obtaining unit which obtains as determination data a cycle time in which the robot performs processing; and a learning unit which learns the operation program of the robot based on an output of the state observation unit and an output of the determination data obtaining unit.

The data on the shaking of the arm and the length of the operation trajectory of the arm may be observed based on an image captured by a camera or data from a robot controller, and the cycle time may be obtained from data from the robot controller or by analyzing an image captured by the camera. The state observation unit may further observe as a state variable at least one of a position, a speed, and an acceleration of the arm. The machine learning device may further include a decision unit which determines an operation of the robot based on the operation program of the robot as learned by the learning unit. The learning unit may include a reward calculation unit which calculates a reward based on the output of the state observation unit and the output of the determination data obtaining unit; and a value function update unit which updates a value function which determines a value of the operation program of the robot based on the output of the state observation unit, the output of the determination data obtaining unit, and an output of the reward calculation unit.

The reward calculation unit may set a negative reward when the cycle time is long and set a positive reward when the cycle time is short. The reward calculation unit is preferable to set a negative reward when the shaking of the arm is great and sets a positive reward when the shaking of the arm is little, and to set a negative reward when the operation trajectory of the arm is long and sets a positive reward when the operation trajectory of the arm is short. The machine learning device may include a neural network. The machine learning device may be provided in each of the robot, be connectable to at least one other machine learning device, and mutually exchange or share a result of machine learning with the at least one other machine learning device. The machine learning device may locate in a cloud server or a fog server.

According to a second aspect of the present invention, there is provided a robot system including a robot controller; the robot controlled by the robot controller; and the machine learning device according to the above described first aspect. The robot system may further include a camera which can observe data on the shaking of the arm and the length of the operation trajectory of the arm, wherein the camera may include at least one of a first camera mounted on the arm of the robot; a second camera mounted on an arm of a peripheral robot provided around the robot; and a third camera provided around the robot. The robot may be a spot welding robot.

According to a third aspect of the present invention, there is provided a machine learning method which learns an operation program of a robot, including observing as a state variable at least one of a shaking of an arm of the robot and a length of an operation trajectory of the arm of the robot; obtaining as determination data a cycle time in which the robot performs processing; and learning the operation program of the robot based on the state variable and the determination data. The learning of the operation program of the robot may include calculating a reward based on the state variable and the determination data; and updating a value function which determines a value of the operation program of the robot based on the state variable, the determination data, and the reward.

BRIEF DESCRIPTION OF THE DRAWINGS

The present invention will be understood more clearly by referring to the following accompanying drawings.

DETAILED DESCRIPTION

Figure 1:
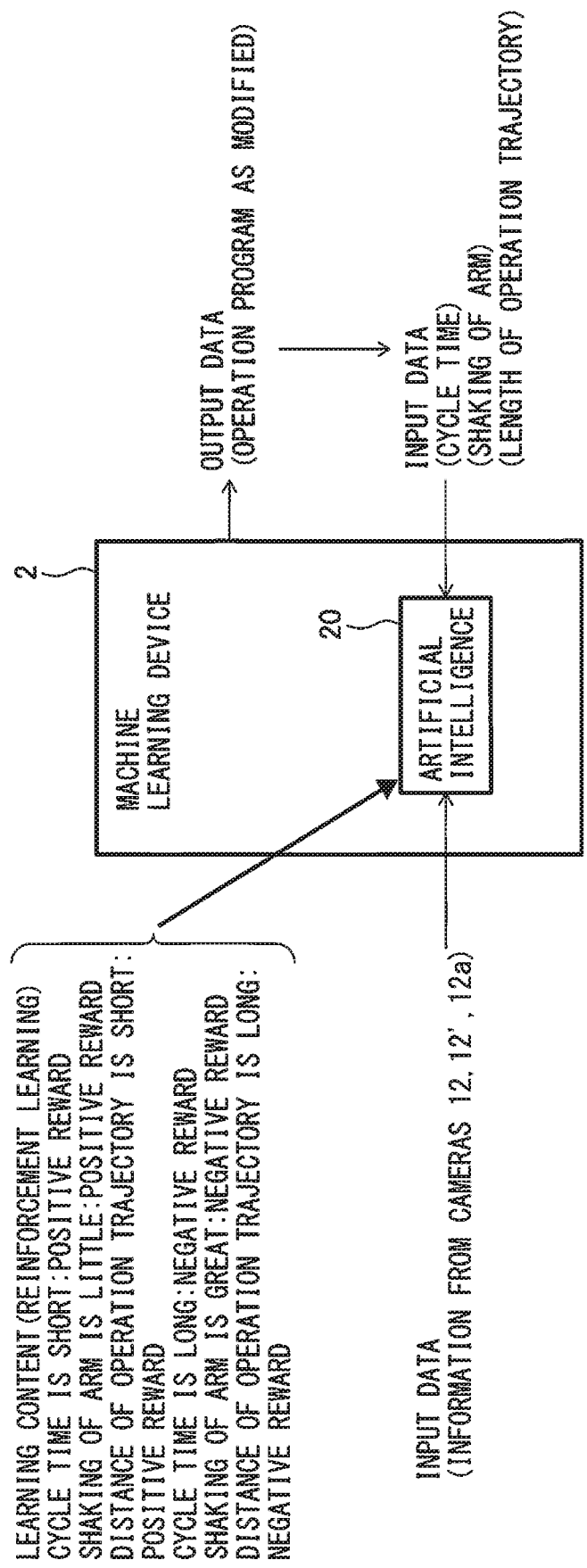
FIG. 1 is a block diagram schematically illustrating an embodiment of a machine learning device of the present invention.

Hereinafter, embodiments of a machine learning device, a robot system, and a machine learning method of the present invention will be described in detail with reference to the accompanying drawings. FIG. 1 is a block diagram schematically illustrating an embodiment of the machine learning device of the present invention.

As illustrated in FIG. 1, the machine learning device according to the present embodiment is to output an operation program of a robot as modified by performing learning of the operation program, for example, by reinforcement learning, and includes an artificial intelligence 20. Such a machine learning device may be provided, for example, to a robot controller (edge) of each robot (1), but may be also provided to each factory having a plurality of robots (robot systems) (for example, on a fog server) or in a cloud server connected to a plurality of factories via a communication line, such as the Internet. Further, the machine learning device provided in each robot may be configured, for example, to be connectable to at least one other machine learning device and to mutually exchange or share a result of machine learning with such at least one other machine learning device.

The artificial intelligence (AI) 20 is realized, for example, by a neural network having a multilayer structure as described later, or the like, and receives data, such as information (image information) from cameras 12, 12', and 12a, a cycle time in which the robot performs processing, the shaking of an arm of the robot, and a length of an operation trajectory of the arm of the robot, to perform learning (reinforcement learning), and outputs the operation program as modified (learned). In other words, such an operation program as learned enables modification of teachings, for example, such that the arm of the robot, a device mounted on the arm, or the like does not come into contact with an operation target and a peripheral material while a length of the cycle time or the like is restrained.

Figure 2:
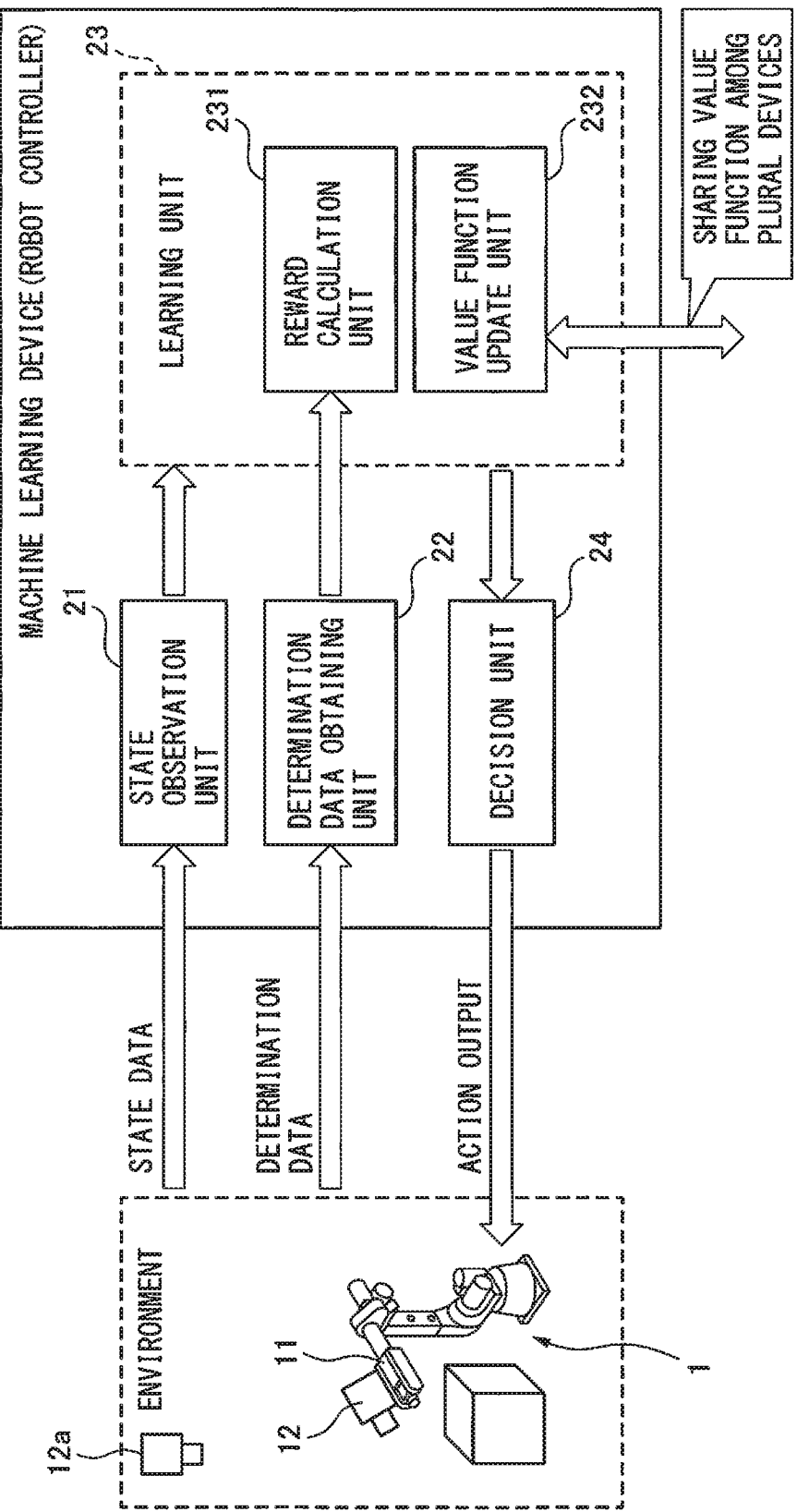
FIG. 2 is a block diagram illustrating an embodiment of a robot system of the present invention.

FIG. 2 is a block diagram illustrating an embodiment of the robot system of the present invention. As illustrated in FIG. 2, the robot system of the present invention includes the robot 1 and a machine learning device 2. As described above, the machine learning device 2 can be provided, for example, to the robot controller which controls an operation of the robot 1.

As illustrated in FIG. 2, the machine learning device 2 (robot controller) includes a state observation unit 21, a determination data obtaining unit 22, a learning unit 23, and a decision unit 24, and the learning unit 23 includes a reward calculation unit 231 and a value function update unit 232. The machine learning device 2 will be later described in detail. On an arm 11 of the robot 1, the camera 12 is provided, and also above the robot 1, the camera 12a is provided. Further, as described later in detail with reference to FIG. 8, for example, the camera (12') mounted on an arm (11') of an adjacent robot (1') can be also used as the camera. Through the information of images captured by such cameras 12 (12') and 12a, for example, data, such as the shaking of the arm 11 and the operation trajectory of the arm 11, are observed and outputted to the machine learning device 2. In addition, the cycle time in which the robot 1 performs processing can be also determined from the information of the images captured by the cameras 12, 12a, but, for example, an output of a timer provided in the robot controller can be also utilized.

Figure 3:
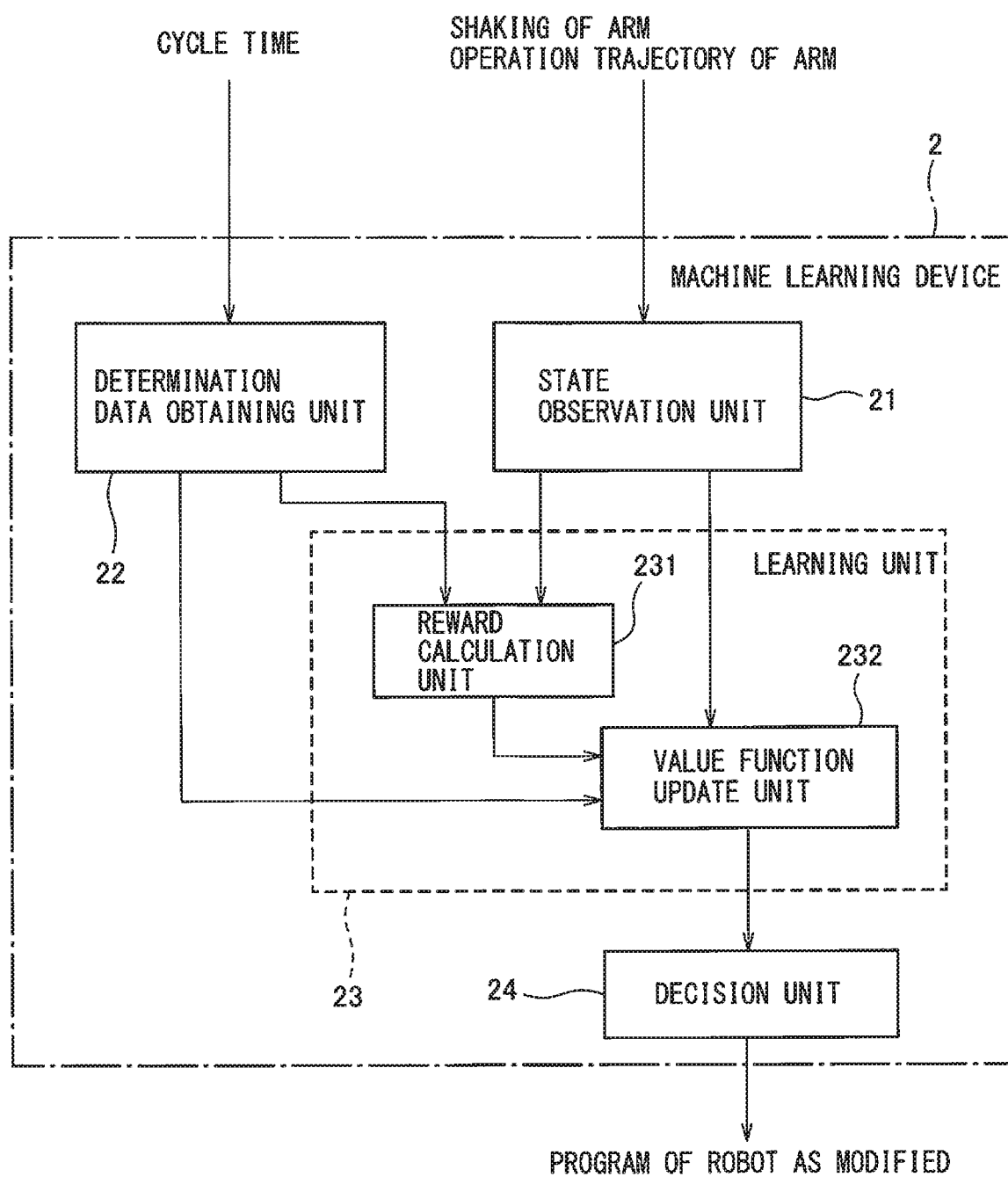
FIG. 3 is a block diagram illustrating an example of the machine learning device of the present invention.

FIG. 3 is a block diagram illustrating an example of the machine learning device of the present invention. As illustrated in FIG. 3, the machine learning device 2 includes the state observation unit 21, the determination data obtaining unit 22, the learning unit 23, and the decision unit 24. The state observation unit 21 observes as a state variable at least one of the shaking of the arm 11 of the robot 1 and the operation trajectory of the arm 11. Data on the shaking of the arm 11 and the operation trajectory of the arm 11 are observed on the basis of an image captured by the cameras (12, 12a) or data from the robot controller as described later. The data from the robot controller includes, for example, data on the operation trajectory of the arm 11 acquired based on a signal from an encoder (rotary encoder) provided on each axis of the robot 1. In addition, the state observation unit 21 can further also observe as the state variable at least one of a position, a speed, and an acceleration of the arm 11 of the robot 1.

The determination data obtaining unit 22 obtains as determination data the cycle time in which the robot 1 performs processing. The learning unit 23 learns the operation program of the robot 1 on the basis of an output of the state observation unit 21 and an output of the determination obtaining unit 22. The learning unit 23 includes the reward calculation unit 231 and the value function update unit 232. The reward calculation unit 231 calculates a reward based on the output of the state observation unit 21 and the output of the determination obtaining unit 22, and the value function update unit 232 updates a value function which determines a value of the operation program of the robot 1 based on the output of the state observation unit 21, the output of the determination data obtaining unit 22, and an output of the reward calculation unit 231. The decision unit 24 determines the operation of the robot 1 based on the operation program of the robot 1 as learned by the learning unit 23.

Incidentally, the machine learning device 2 has functions of analytically extracting, from a set of data as inputted into the device, a useful rule, a knowledge representation, a criterion for determination or the like contained therein, outputting a result of the determination, and performing knowledge learning (machine learning). Various techniques are available for the machine learning, which are broadly classified into, for example, "supervised learning", "unsupervised learning", and "reinforcement learning". In addition, there is a technique referred to as "deep learning" in which extraction of a feature value per se is learned in order to implement these techniques.

The machine learning device 2 as illustrated in FIG. 3 employs "reinforcement learning (Q-learning)". Although the machine learning device 2 may use a general-purpose computer or a processor, adoption of, for example, general-purpose computing on graphics processing units (GPGPU), large-scale PC clusters or the like allows higher processing. With respect to the whole of machine learning, an outline will be described.

First, in supervised learning, a large quantity of teacher data, i.e., data sets of certain inputs and results (labels) are provided to the machine learning device to learn features in the data sets and inductively acquire a model (error model) for estimating the result from the input, i.e., a relationship thereof. For example, supervised learning can be implemented using an algorithm, such as a neural network as described below.

Unsupervised learning is a technique in which a large quantity of input data alone are provided to the machine learning device to learn how the input data are distributed and the device that performs compression, classification, shaping or the like with respect to the input data performs learning without being provided with corresponding teacher output data. For example, features in the data sets can be clustered into similar features. Using this result, it is possible to achieve prediction of output by allocating outputs such that some criterion is defined to optimize the result.

As intermediate problem setting between unsupervised learning and supervised learning, there is one referred to as semi-supervised learning, which applies to a case, for example, in which there are only some data sets of inputs and outputs and the remaining data are only inputs.

Next, reinforcement learning will be described further in detail. First, a problem setting in reinforcement learning is considered as follows.

A robot system (i.e., the robot 1 and the robot controller (including, for example, the machine learning device 2)) observes a state of the environment and decides an action.

The environment may change in accordance with some rule, and further, the robot system may change the environment by its own action.

A reward signal returns each time the action is taken.

It is the sum of (discounted) rewards in the future, which is desired to be maximized.

Learning starts in a state in which the result caused by the action is completely not known or only incompletely known. In other words, the robot controller can obtain the result as data only after it actually takes an action. In short, it is preferable to explore the optimum action by trial and error.

By setting a state in which learning (a technique, such as supervised learning as described above or inverse reinforcement learning) is performed in advance to mimic a human behavior as the initial state, learning may be started from a good starting point.

Reinforcement learning is a technique in which, not only by determination or classification but also by learning actions, an appropriate action is learned in consideration of the interaction provided by an action to environment, i.e., how to maximize the reward obtained in the future is learned. Hereinafter, description is continued with an example of Q-learning, but the present invention is not limited to Q-learning.

Q-learning is a method for learning a value $Q(s, a)$ for selecting an action a in a certain environmental state s. In other words, in the certain state s, an action a with the highest value $Q(s, a)$ may be preferably selected as the optimum action. However, at first, the correct value for the value $Q(s, a)$ is completely not known for a pair of the state s and the action a. Accordingly, an agent (action subject) selects various actions a under the certain state s and is given a reward for the action a at that time. Consequently, the agent learns to select a better action, i.e., a correct value $Q(s, a)$.

Further, as a result of the action, it is desired to maximize the sum of the rewards obtained in the future, and it is aimed to finally satisfy $Q(s, a) = E[\Sigma \gamma^t r_t]$. The expected value is assumed to be taken for the case when the state changes following the optimum action, and since it is not known, it is learned by making exploration. An update formula for such value $Q(s, a)$ may be represented, for example, by equation (1) as follows:

$$Q(s_t, a_t) \leftarrow Q(s_t, a_t) + \alpha \left( r_{t+1} + \gamma \max_a Q(s_{t+1}, a) - Q(s_t, a_t) \right) \quad (1)$$

In the above equation (1), $s_t$ represents a state of the environment at a time t, and $a_t$ represents an action at the time t. The action $a_t$ changes the state to $s_{t+1}$. $r_{t+1}$ represents a reward that can be gained with the change of the state. Further, the term attached with max is the product of the Q-value multiplied by $\gamma$ for the case where the action a with the highest Q-value known at that time is selected under the state $s_{t+1}$. $\gamma$ is a parameter satisfying $0 < \gamma \leq 1$, and referred to as a discount rate. $\alpha$ is a learning factor, which is in the range of $0 < \alpha \leq 1$.

The above equation (1) represents a method for updating the evaluation value $Q(s_t, a_t)$ of the action at in the state $s_t$ on the basis of the reward $r_{t+1}$ returned as a result of the action $a_t$. In other words, it is indicated that when sum of the reward $r_{t+1}$ and the evaluation value $Q(s_{t+1}, \max a_{t+1})$ of the best action max a in the state subsequent to the state s upon the action a is larger than the evaluation value $Q(s_t, a_t)$ of the action a in the state s, $Q(s_t, a_t)$ is increased; otherwise, $Q(s_t, a_t)$ is decreased. In other words, it is configured such that a value of a certain action in a certain state is made to be closer to the reward that is instantly returned as a result and the value of the best action in the subsequent state upon that action.

Methods of representing Q(s, a) on a computer include a method in which values of all state-action pairs (s, a) are held in the form of a table and a method in which a function approximating Q(s, a) is provided. In the latter method, the above equation (1) can be implemented by adjusting parameters of the approximation function using a technique, such as a stochastic gradient descent method. As the approximation function, a neural network described later may be used.

Figure 4:
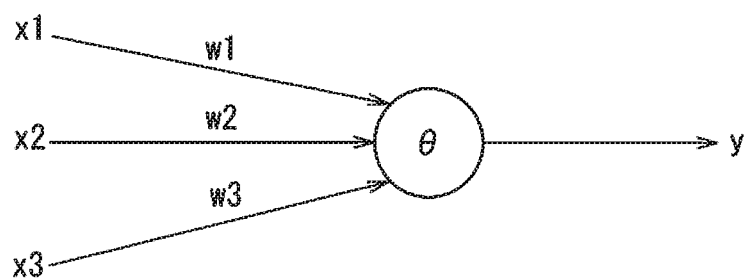
FIG. 4 is a diagram schematically illustrating a model for a neuron.
Figure 5:
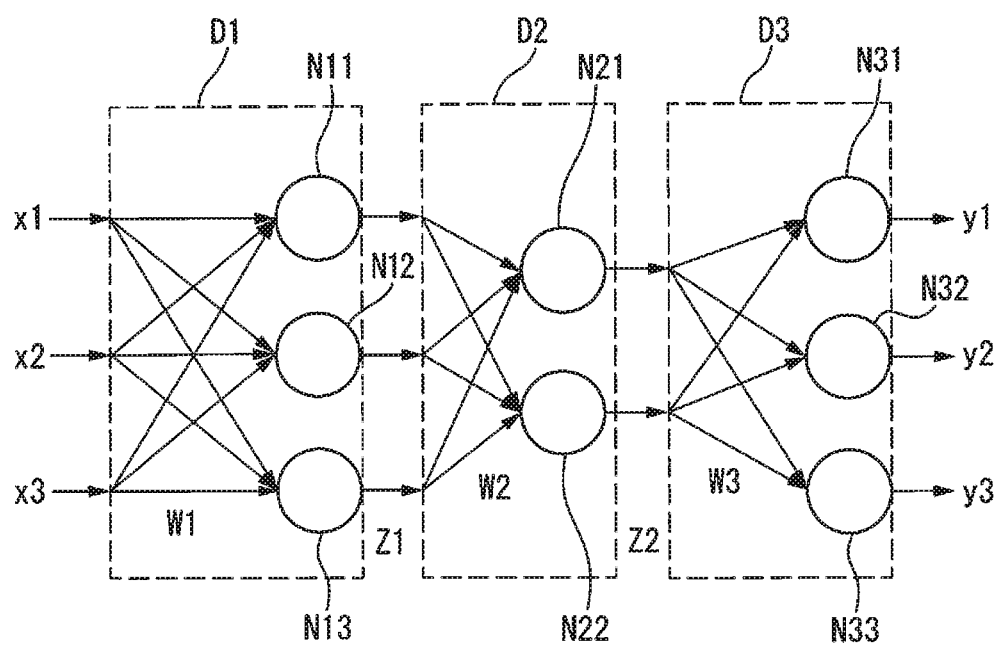
FIG. 5 is a diagram schematically illustrating a three-layer neural network formed by combining the neurons as illustrated in FIG. 4.

As an approximation algorithm for a value function in reinforcement learning, a neural network may also be used. FIG. 4 is a diagram schematically illustrating a model for a neuron, and FIG. 5 is a diagram schematically illustrating a three-layer neural network formed by combining neurons as illustrated in FIG. 4. In other words, the neural network is configured, for example, of an arithmetic device simulating a model for a neuron as illustrated in FIG. 4, a memory, and the like.

As illustrated in FIG. 4, the neuron outputs an output (result) y for a plurality of inputs x (in FIG. 4, by way of example, inputs x1 to x3). Each of the inputs x (x1, x2, x3) is multiplied by a weight w (w1, w2, w3) corresponding to the input x. Thereby, the neuron outputs the result y represented by the following equation (2). Note that all of the input x, the result y, and the weight w are vectors. In the equation (2) below, θ is a bias, and $f_k$ is an activation function.

$$y = f_k(\Sigma_{i=1}^{n} x_i w_i - \theta) \qquad (2)$$

Referring to FIG. 5, a description will be given of a three-layer neural network formed by a combination of neurons as illustrated in FIG. 4. As illustrated in FIG. 5, a plurality of inputs x (by way of example herein, inputs x1 to input x3) are inputted from the left side of the neural network, and a result y (by way of example herein, result y1 to input y3) is outputted from the right side. Specifically, the inputs x1, x2, and x3 are multiplied by a weight corresponding to each of three neurons N11 to N13 and inputted. The weights used to multiply these inputs are collectively denoted by W1.

The neurons N11 to N13 output z11 to z13, respectively. In FIG. 5, z11 to z13 are collectively referred to as a feature vector Z1, which may be regarded as a vector which is obtained by extracting feature values of the input vector. The feature vector Z1 is a feature vector defined between the weight W1 and the weight W2. z11 to z13 are multiplied by a weight corresponding to each of the two neurons N21 and N22 and inputted. The weights used to multiply these feature vectors are collectively denoted by W2.

The neurons N21 and N22 output z21 and z22, respectively. In FIG. 5, z21, z22 are collectively referred to as a feature vector Z2. The feature vector Z2 is a feature vector defined between the weight W2 and the weight W3. z21 and z22 are multiplied by a weight corresponding to each of the three neurons N31 to N33 and inputted. The weights used to multiply these feature vectors are collectively denoted by W3.

Finally, the neurons N31 to N33 output result y1 to result y3, respectively. The operation of the neural network includes a learning mode and a value prediction mode. For example, in the learning mode, the weight W is learned using a learning data set, and in the prediction mode, the action of the robot controller is determined using the parameters. Although reference is made to prediction for convenience, it is needless to say that various tasks, such as detection, classification, inference, and the like, are possible.

It is possible that the data obtained by actually operating the robot controller in the prediction mode is immediately learned to be reflected on the subsequent action (on-line learning) and also that a group of pre-collected data is used to perform collective learning and a detection mode is executed with the parameter since then (batch learning). An intermediate case is also possible, where a learning mode is interposed each time data is accumulated to a certain degree.

The weights W1 to W3 can be learned by an error backpropagation method. The error information enters from the right side and flows to the left side. The error back propagation method is a technique for adjusting (leaning) each weight so as to reduce the difference between an output y when an input x is inputted and a true output y (teacher) for each neuron. Such a neural network can have three or more layers (referred to as deep learning). It is possible to extract features of the input step by step to automatically acquire an arithmetic device, which feeds back the results, from the teacher data alone.

As described with reference to FIG. 3, the machine learning device 2 according to the present example includes the state observation unit 21, the determination data obtaining unit 22, the learning unit 23, and the decision unit 24, for example, to perform Q-learning. Note that the machine learning method applied to the present invention is not limited to Q-learning, and as described above, the machine learning device 2 can be realized by adopting GPGPU, large-scale PC clusters or the like.

Figure 6:
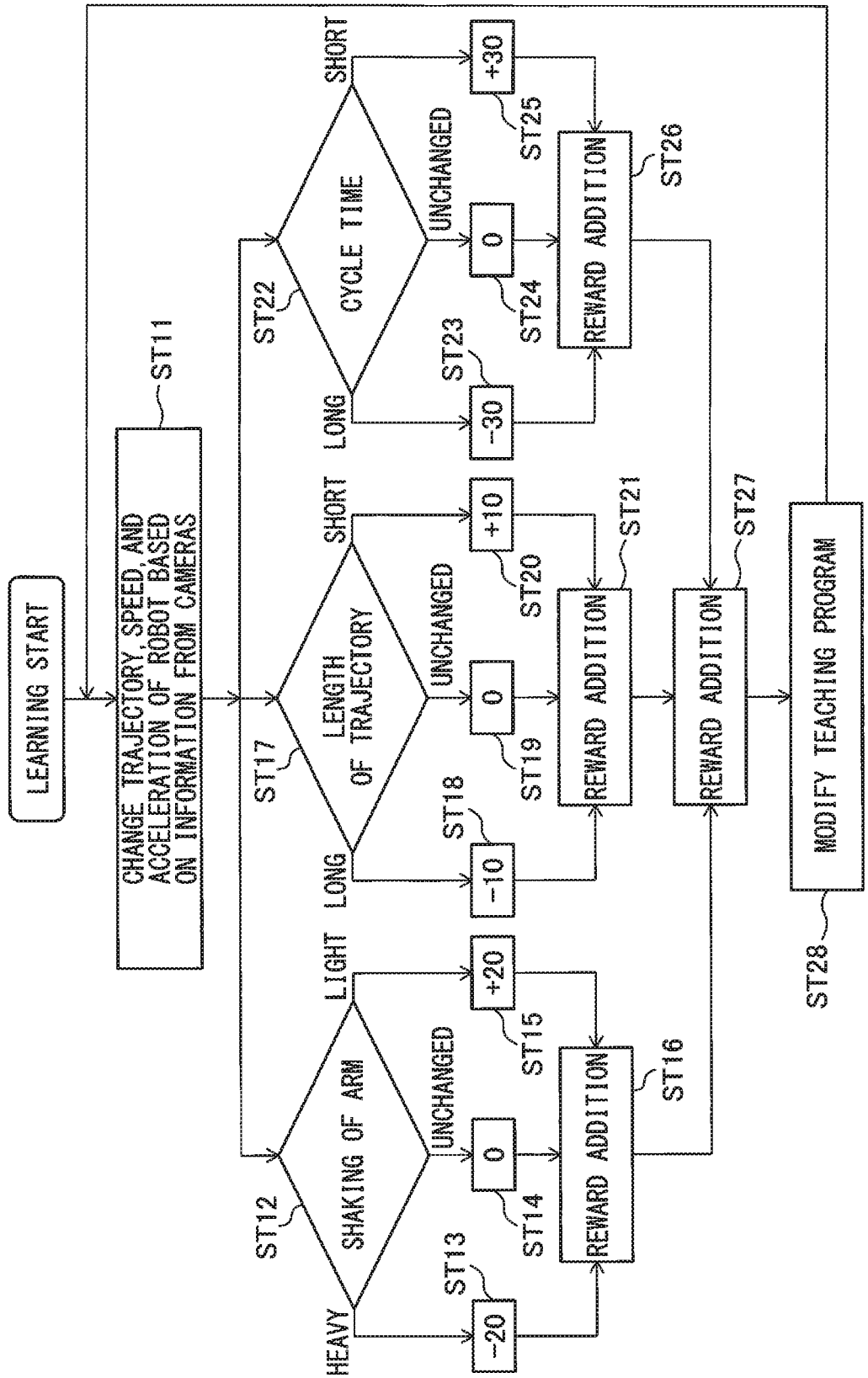
FIG. 6 is a flowchart illustrating an example of processing in the machine learning device as illustrated in FIG. 3.

FIG. 6 is a flowchart illustrating an example of processing in the machine learning device as illustrated in FIG. 3. As illustrated in FIG. 6, when machine learning starts (learning start), at step ST11, the trajectory, the speed, and the acceleration of the robot 1 (arm 11) are changed on the basis of the information from the cameras 12 and 12a. Next, at step ST12, the shaking of the arm 11 is determined, at step ST17, the length of the trajectory of the arm 11 is determined, and at step ST22, the cycle time is determined. With respect to the determination of the shaking of the arm 11 at step ST12, the determination of the length of the trajectory of the arm 11 at step ST17, and the determination of the cycle time at step ST22, instead of performing all of the determinations, only a part of the determinations (for example, only the determination of the shaking of the arm 11 at step ST12 and the determination of the cycle time at step ST22) may be performed. Alternatively, further, it is also possible to further add another determination item.

In the example of the processing as illustrated in FIG. 6, at step ST12, when the shaking of the arm 11 is determined to be heavy (great), the process advances to step ST13 and "−20" (reward value) is set; when the shaking of the arm 11 is determined to be unchanged, the process advances to step ST14 and "0" is set; or when the shaking of the arm 11 is determined to be light (little), the process advances to step ST15 and "+20" is set; and then the process advances to step ST16 and reward addition is performed.

At step ST17, when the length of the trajectory of the arm 11 is determined to be long, the process advances to step ST18 and "−10" (reward value) is set; when the length of the trajectory of the arm 11 is determined to be unchanged, the process advances to step ST19 and "0" is set; or when the length of the trajectory of the arm 11 is determined to be short, the process advances to step ST20 and "+10" is set; and then the process advances to step ST21 and reward addition is performed.

At step ST22, when the cycle time is determined to be long, the process advances to step ST23 and "−30" (reward value) is set; when the cycle time is determined to be unchanged, the process advances to step ST24 and "0" is set; or when the cycle time is determined to be short, the process advances to step ST25 and "+30" is set; and further, the process advances to step ST26 and reward addition is performed.

As described above, the reward values are weighted according to respective determination items, and in the example of the processing as illustrated in FIG. 6, for example, the determination of the cycle time at step ST22 is greatly weighted ("−30, 0, +30") and the determination of the length of the trajectory of the arm 11 at step ST17 is slightly weighted ("−10, 0, +10"). Weighting according to respective determination items can be varied to take a positive value or a negative value, or weighting may be made to take the same value with respect to all the items.

Next, the process advances to step ST27 and the reward values with respect to respective determination items added at above-described steps ST16, ST21, and ST26 are added together, and the process further advances to step ST28 and on the basis of the reward values added at step ST27, a teaching program (operation program of the robot) is modified. When the process at step ST28 is completed, for example, the process returns to step ST11 and the similar processing is repeated.

The processes at respective steps as described above can be performed by respective blocks in FIG. 3 as described above. In other words, the addition of the reward values at steps ST12 to ST27 can be performed, for example, as reward calculation process by the reward calculation unit 231 in FIG. 3. The modification of the teaching program at step ST28 can be performed, for example, by update process of the value function (action value table) by the value function update unit 232 and determination process of the operation program (teaching program) of the robot based on the value function as updated by the decision unit 24 in FIG. 3. Thus, according to the present embodiment, the operation program of the robot as modified can be obtained.

Figure 7:
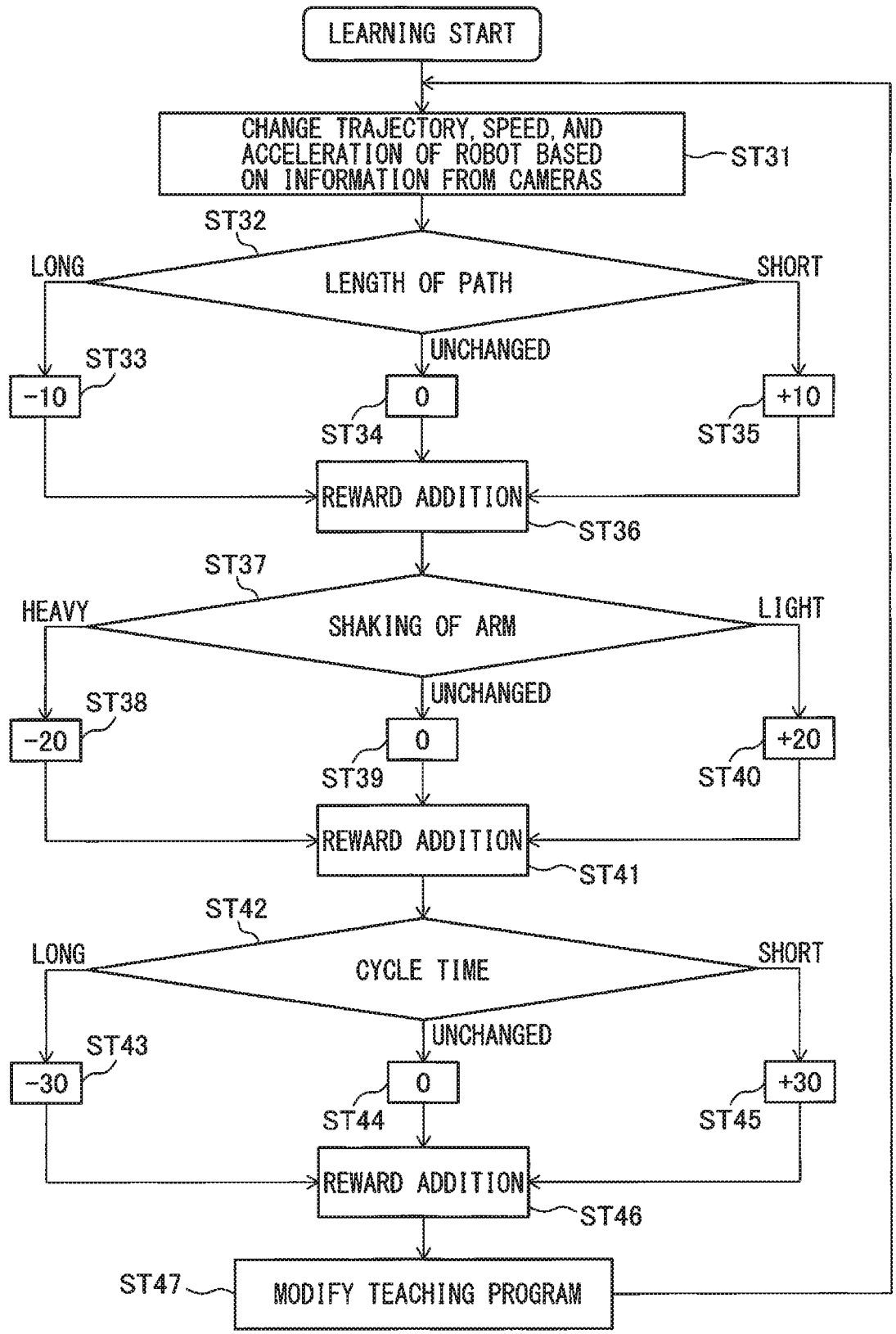
FIG. 7 is a flowchart illustrating another example of the processing in the machine learning device as illustrated in FIG. 3.

FIG. 7 is a flowchart illustrating another example of the processing in the machine learning device as illustrated in FIG. 3. As illustrated in FIG. 7, when machine learning starts (learning start), at step ST31, the trajectory, the speed, and the acceleration of the robot 1 (arm 11) are changed on the basis of the information from the cameras 12 and 12a. The process further advances to step ST32 and the length of the trajectory of the arm 11 is determined; when the length of the trajectory of the arm 11 is determined to be long, the process advances to step ST33 and "−10" (reward value) is set; when the length of the trajectory of the arm 11 is determined to be unchanged, the process advances to step ST34 and "0" is set; or when the length of the trajectory of the arm 11 is determined to be short, the process advances to step ST35 and "+10" is set; and then the process advances to step ST36 and reward addition is performed.

Next, the process advances to step ST37 and the shaking of the arm 11 is determined; when the shaking of the arm 11 is determined to be heavy, the process advances to step ST38 and "−20" (reward value) is set; when the shaking of the arm 11 is determined to be unchanged, the process advances to step ST39 and "0" is set; or when the shaking of the arm 11 is determined to be light, the process advances to step ST40 and "+20" is set; and then the process advances to step ST41 and reward addition is performed. The process advances to step ST42 and the cycle time is determined; when the cycle time is determined to be long, the process advances to step ST43 and "−30" (reward value) is set; when the cycle time is determined to be unchanged, the process advances to step ST44 and "0" is set; or when the cycle time is determined to be short, the process advances to step ST45 and "+30" is set; and the process then advances to step ST46 and reward addition is performed. The process further advances to step ST47 and the teaching program is modified on the basis of the added reward values. When the process at step ST47 is completed, for example, the process returns to step ST31 and the similar processing is repeated.

Similarly to the determinations described with reference to FIG. 6, with respect to the determination of the length of the trajectory of the arm 11 at steps ST32 to ST36, the determination of the shaking of the arm 11 at steps ST37 to ST41, and the determination of the cycle time at steps ST42 to ST46, instead of performing all of the determinations, only a part of the determinations may be performed, or a determination item may be further added. In addition, weighting according to respective determination items may be suitably varied. In addition, the processes at respective steps can be performed, for example, by respective blocks as illustrated in FIG. 3 as described above.

Figure 8:
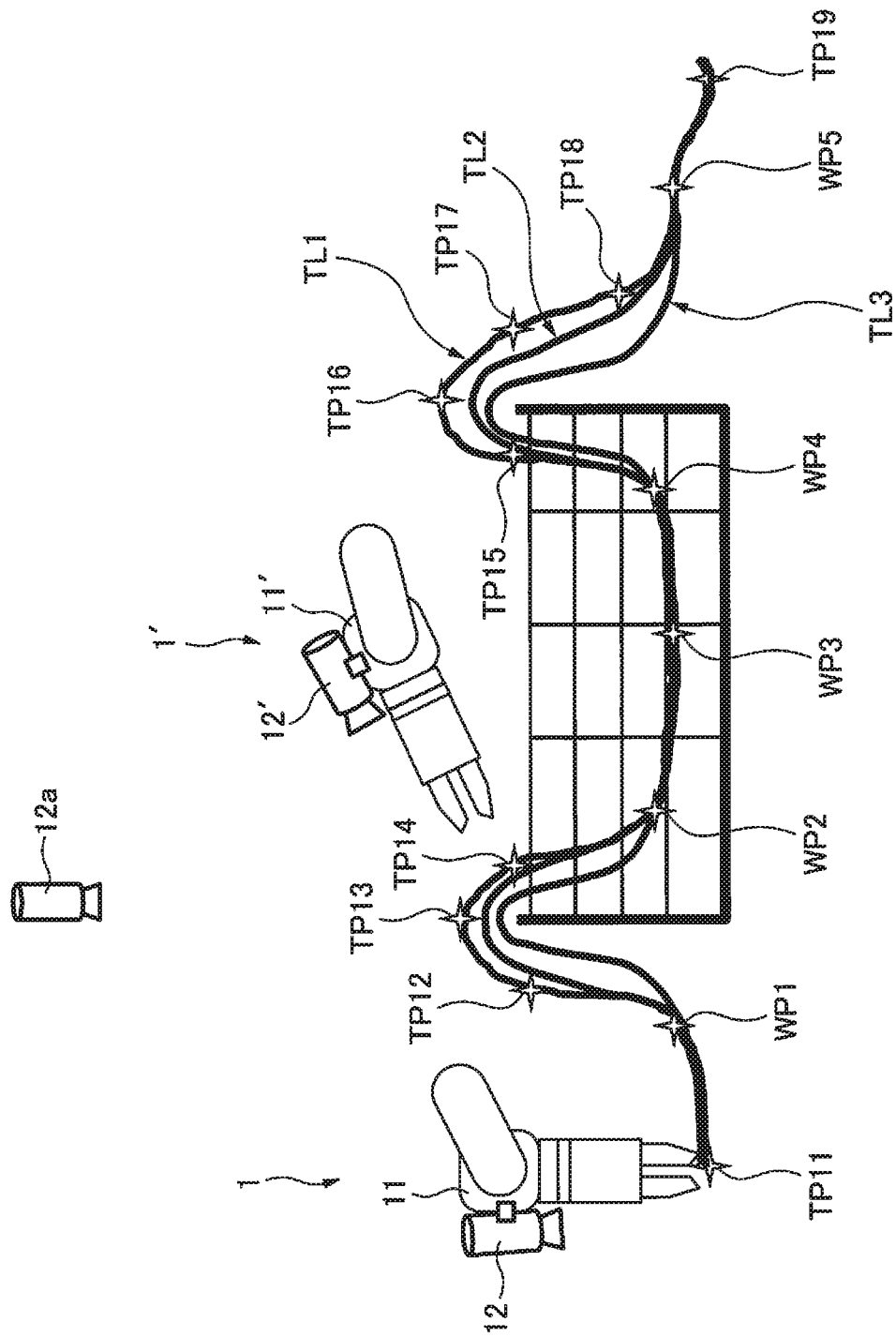
FIG. 8 is a diagram for illustrating a trajectory of an arm of a robot in the robot system.

FIG. 8 is a diagram for illustrating the trajectory of the arm of the robot in the robot system, and is to schematically illustrate the trajectory of the arm, for example, when the arm 11 of the robot 1 which performs spot welding is moved in a direction from left to right in the drawing to perform spot welding. In FIG. 8, reference signs WP1 to WP5 denote positions (welding points at which spot welding is performed) which the arm 11 (welding head) of the robot 1 is required to pass, and reference signs TP11 to TP19 denote points (teaching points) which are taught by the teacher to the robot 1.

In addition, in FIG. 8, a curve TL1 indicates the trajectory (operation trajectory) of the arm 11 taught by a person (teacher), a curve TL2 indicates the trajectory of the arm 11 based on the operation program of the robot as obtained and modified by the machine learning device according to the present embodiment as described above, and a curve TL3 indicates the trajectory of the arm 11 passing a path in which a distance to a peripheral material and a workpiece (operation target) is the shortest. As illustrated in FIG. 8, the arm 11 of the robot 1 is provided with the camera 12, and it is configured, for example, to be capable of confirming a distance to the operation target and operation positions (welding points) and acquiring information on the shaking of the arm 11 and the like.

Above the robot 1 and at a position from which the entirety of an operation area in which an operation is performed by the robot 1 (arm 11) can be looked over, the camera 12a is provided, and it is configured, for example, to be capable of acquiring a distance and a positional relationship between the arm 11 or a device mounted on the arm 11 and the operation target and the peripheral material, and information on the shaking of the arm 11, the trajectory of the arm 11, and the like. As the camera, it is also possible to use, for example, the camera (12') which is mounted on the arm (11') of the peripheral robot (1').

In FIG. 8, the reference sign 1' denotes a peripheral robot provided around (for example, adjacent to) the robot 1, and an arm 11' of the robot 1' is also provided with the camera 12'. The camera 12' provided on the arm 11' of the peripheral robot 1' can capture the arm 11 of the robot 1 and determine the shaking and the trajectory of the arm 11 of the robot 1 on the basis of the captured data. In other words, the shaking and the trajectory of the arm 11 of the certain robot 1 can be determined from data captured by the camera 12' provided on the arm 11' of the peripheral robot 1'. Note that the peripheral robot 1' is not limited, for example, to one adjacent robot, and data captured by respective cameras of a plurality of robots in the vicinity can also be switched for use as appropriate.

By the camera 12a or various types of sensors, such as an acceleration sensor provided on the arm 11 together with the camera 12, or by the camera 12' mounted on the peripheral robot 1' and various types of sensors provided in the robots 1 and 1', information on the speed, the acceleration, and the like of the arm 11 of the robot 1 can be acquired. In addition, the cycle time of the processing by the robot 1 can be acquired from output data of a timer of the robot controller which controls the robot 1, and the like, but it can be also acquired, for example, by analyzing an image acquired by the camera 12a or the like. It is needless to say that a location at which the camera is mounted is not limited to a location above the robot 1, but may be around the robot 1, e.g., at a side or below the robot 1.

As illustrated in FIG. 8, for example, it is apparent that the trajectory TL2 in accordance with the operation program of the robot as modified by learning of the machine learning device 2 according to the present embodiment differs from the trajectory TL1 taught by the teacher and also differs from the trajectory TL3 passing a path in which a distance to the peripheral material and the workpiece is the shortest.

In other words, it is apparent that the trajectory TL1 determined by the teacher (person) in consideration of conditions, such as the shaking of the arm 11 of the robot 1, the length of the operation trajectory, or the cycle time in which the robot performs processing largely deviates from the trajectory (trajectory obtained by machine learning) TL2 considered to be favorable with respect to various conditions. It is also apparent that the trajectory TL2 obtained by machine learning differs from the trajectory TL3 passing a path in which a distance to the peripheral material and the workpiece is merely the shortest. In other words, it can be also considered because in the trajectory TL3 passing the shortest path, the speed and the acceleration of the arm 11 is required to be reduced or the shaking of the arm 11 becomes great, so that a time necessary for spot welding becomes long.

As described above in detail, according to the machine learning device, the robot system, and the machine learning method according to the present embodiment, the operation program of the robot as modified can be obtained. Thus, for example, it is possible to modify teachings such that the arm of the robot, a device mounted on the arm, or the like does not come into contact with an operation target and a peripheral material. It is needless to say that application of the present embodiment is not limited to the robot performing spot welding but application can be widely made to various industrial robots and service robots.

The machine learning device, the robot system, and the machine learning method of the present invention provide an advantageous effect of being capable of obtaining an operation program of a robot as modified.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A machine learning device configured to learn an operation program of a robot, the machine learning device comprising a processor configured to:
   observe, as a state variable, a shaking of an arm of the robot and a length of an operation trajectory of the arm of the robot;
   obtain, as determination data, a cycle time in which the robot performs processing;
   learn the operation program of the robot, based on the state variable and the determination data, by
      calculating a reward based on the state variable and the determination data, the reward including positive rewards and negative rewards;
      adding the positive rewards and the negative rewards together to obtain an added reward value for each of the shaking of the arm, the length of the operation trajectory of the arm, and the cycle time;
      further adding the added reward value for each of the shaking of the arm, the length of the operation trajectory of the arm, and the cycle time together to obtain a further added reward value; and
      updating a value function which determines a value of the operation program of the robot based on the state variable, the determination data, and the further added reward value;
   determine an operation of the robot based on the learned operation program; and
   output the determined operation of the robot to the robot,
   wherein the processor is configured to set a negative reward among the negative rewards based on the state variable and the determination data and cause the robot to operate with the shaking of the arm being reduced, and
   wherein the processor is configured to set a further negative reward among the negative rewards based on the state variable and the determination data and cause the robot to operate with a reduced cycle time.

2. The machine learning device according to claim 1, wherein
   data on the shaking of the arm and the length of the operation trajectory of the arm is observed based on an image captured by a camera or data from a robot controller, and
   the cycle time is obtained from data from the robot controller or by analyzing an image captured by the camera.

3. The machine learning device according to claim 1, wherein
   the processor is further configured to observe, as the state variable, at least one of a position, a speed, and an acceleration of the arm.

4. The machine learning device according to claim 1, wherein the processor is further configured to determine
   an operation of the robot based on the learned operation program.

5. The machine learning device according to claim 1, wherein the machine learning device further comprises a neural network.

6. The machine learning device according to claim 1, wherein the machine learning device is provided in each of a plurality of the robots, at least one of the plurality of robots connectable to at least one other machine learning device, the machine learning device configured to mutually exchange or share a result of machine learning with the at least one other machine learning device.

7. The machine learning device according to claim 1, wherein the machine learning device is located in a cloud server or a fog server.

8. A machine learning method for learning an operation program of a robot, the machine learning method comprising:

observing, as a state variable, a shaking of an arm of the robot and a length of an operation trajectory of the arm of the robot;

obtaining, as determination data, a cycle time in which the robot performs processing;

learning the operation program of the robot based on the state variable and the determination data, wherein the learning of the operation program of the robot comprises:

calculating a reward based on the state variable and the determination data, the reward including positive rewards and negative rewards;

adding the positive rewards and the negative rewards together to obtain an added reward value for each of the shaking of the arm, the length of the operation trajectory of the arm, and the cycle time;

further adding the added reward value for each of the shaking of the arm, the length of the operation trajectory of the arm, and the cycle time together to obtain a further added reward value; and updating a value function which determines a value of the operation program of the robot based on the state variable, the determination data, and the further added reward value;

determining an operation of the robot based on the learned operation program; and outputting the determined operation of the robot to the robot, wherein the machine learning method further comprises:

setting a negative reward among the negative rewards based on the state variable and the determination data and causing the robot to operate with the shaking of the arm being reduced; and setting a further negative reward among the negative rewards based on the state variable and the determination data and causing the robot to operate with a reduced cycle time.

\* \* \* \* \*